(12) United States Patent
Immelman et al.

(10) Patent No.: US 10,160,692 B2
(45) Date of Patent: Dec. 25, 2018

(54) MICRONIZED COMPOSITION

(71) Applicant: Johanna Frederika Immelman, Bedfordview (ZA)

(72) Inventors: Andre Immelman, Bedfordview (ZA); Henry Howell Hoek, Kempton Park (ZA)

(73) Assignee: Johanna Frederika Immelman, Bedfordview (ZA)

( * ) Notice: Subject to any disclaimer, the term of this patent is extended or adjusted under 35 U.S.C. 154(b) by 0 days.

(21) Appl. No.: 15/129,014

(22) PCT Filed: Aug. 7, 2014

(86) PCT No.: PCT/IB2014/063769
§ 371 (c)(1),
(2) Date: Sep. 26, 2016

(87) PCT Pub. No.: WO2015/145221
PCT Pub. Date: Oct. 1, 2015

(65) Prior Publication Data
US 2017/0096377 A1  Apr. 6, 2017

(30) Foreign Application Priority Data
Mar. 27, 2014 (ZA) .................. 2014/02264

(51) Int. Cl.
*C05D 9/02* (2006.01)
*C05D 9/00* (2006.01)
(Continued)

(52) U.S. Cl.
CPC .............. *C05D 9/02* (2013.01); *C05B 17/00* (2013.01); *C05C 9/005* (2013.01); *C05D 9/00* (2013.01);
(Continued)

(58) Field of Classification Search
CPC ........ C05D 9/02; C05G 3/0041; C05B 17/00; C05C 9/005
See application file for complete search history.

(56) References Cited

U.S. PATENT DOCUMENTS 5,918,413 A * 7/1999 Otani ................. A01C 1/06
442/166
9,718,738 B2 * 8/2017 Iwig ................. C05G 3/0035
(Continued)

FOREIGN PATENT DOCUMENTS

| CN | 101595870 | 6/2009 |
|---|---|---|
| CN | 101844949 | 5/2010 |
| WO | 2012156906 | 11/2012 |

OTHER PUBLICATIONS

Sorbent Systems, "Desiccant Chart Comparisons". pp. 1-3 <https://web.archive.org/web/20130213021211/https://www.sorbentsystems.com/desiccants_charts.html> Feb. 13, 2012.*
(Continued)

*Primary Examiner* — Jennifer A Smith
(74) *Attorney, Agent, or Firm* — The Roy Gross Law Firm, LLC; Roy Gross (57) ABSTRACT

The invention relates to a micronized composition. In particular the invention relates to a micronized composition, a coated fertilizer, a coated seed, a method of producing a micronized composition and a method of covering a granule. The micronized composition includes at least one type of water-soluble micronutrient, a clay binder and a dehydrating agent, the at least one water-soluble micronutrient, clay binder and dehydrating agent being micronized.

14 Claims, 8 Drawing Sheets

(51) Int. Cl.
*C05G 3/00* (2006.01)
*C05B 17/00* (2006.01)
*C05C 9/00* (2006.01)

(52) U.S. Cl.
CPC ......... *C05G 3/0029* (2013.01); *C05G 3/0041* (2013.01)

(56) References Cited

U.S. PATENT DOCUMENTS

| | | |
|---|---|---|
| 2002/0139158 A1 | 10/2002 | Hunter |
| 2002/0174697 A1* | 11/2002 | Reid ..................... C05B 17/00 71/23 |
| 2010/0267554 A1 | 10/2010 | Madsen et al. |
| 2011/0224080 A1 | 9/2011 | Lelas et al. |

OTHER PUBLICATIONS

Written Opinion of PCT/IB2014/063769 Completed Nov. 24, 2014; dated Dec. 9, 2014 4 pages.
International Search Report of PCT/IB2014/063769 Completed Nov. 24, 2014; dated Dec. 9, 2014 4 pages.

* cited by examiner

| Size (μm) | Vol Under % | Size (μm) | Vol Under % | Size (μm) | Vol Under % | Size (μm) | Vol Under % | Size (μm) | Vol Under % |
|---|---|---|---|---|---|---|---|---|---|
| 0.010 | 0.00 | 0.810 | 1.79 | 5.709 | 22.37 | 38.000 | 89.42 | 106.852 | 99.39 | 753.265 | 100.00 |
| 0.013 | 0.00 | 1.034 | 2.67 | 7.287 | 31.85 | 40.244 | 90.22 | 136.397 | 99.95 | 961.542 | 100.00 |
| 0.187 | 0.00 | 1.320 | 3.50 | 9.302 | 43.04 | 45.000 | 91.68 | 174.110 | 100.00 | 1227.408 | 100.00 |
| 0.239 | 0.00 | 1.684 | 4.38 | 11.874 | 54.76 | 51.371 | 93.29 | 222.251 | 100.00 | 1566.785 | 100.00 |
| 0.305 | 0.00 | 2.150 | 5.53 | 15.157 | 65.65 | 65.575 | 95.94 | 283.704 | 100.00 | 2000.000 | 100.00 |
| 0.389 | 0.00 | 2.745 | 7.34 | 19.348 | 74.69 | 75.000 | 97.18 | 362.148 | 100.00 | | |
| 0.497 | 0.27 | 3.503 | 10.36 | 24.698 | 81.54 | 83.707 | 98.04 | 462.281 | 100.00 | | |
| 0.634 | 0.94 | 4.472 | 15.21 | 31.527 | 86.50 | 102.000 | 99.20 | 590.102 | 100.00 | | |

| Size (μm) | Vol Under % |
|---|---|
| 0.020 | 0.00 |
| 0.022 | 0.00 |
| 0.025 | 0.00 |
| 0.028 | 0.00 |
| 0.032 | 0.00 |
| 0.036 | 0.00 |
| 0.040 | 0.00 |
| 0.045 | 0.00 |
| 0.050 | 0.00 |
| 0.056 | 0.00 |
| 0.063 | 0.00 |
| 0.071 | 0.00 |
| 0.080 | 0.00 |
| 0.089 | 0.00 |
| 0.100 | 0.00 |
| 0.112 | 0.00 |
| 0.126 | 0.00 |

| Size (μm) | Vol Under % |
|---|---|
| 0.142 | 0.00 |
| 0.159 | 0.00 |
| 0.178 | 0.00 |
| 0.200 | 0.00 |
| 0.224 | 0.00 |
| 0.252 | 0.00 |
| 0.283 | 0.00 |
| 0.317 | 0.02 |
| 0.356 | 0.31 |
| 0.399 | 0.82 |
| 0.448 | 1.59 |
| 0.502 | 2.64 |
| 0.564 | 3.99 |
| 0.632 | 5.67 |
| 0.710 | 7.66 |
| 0.796 | 9.97 |
| 0.893 | 12.59 |

| Size (μm) | Vol Under % |
|---|---|
| 1.002 | 15.50 |
| 1.125 | 18.68 |
| 1.262 | 22.08 |
| 1.416 | 25.68 |
| 1.589 | 29.41 |
| 1.783 | 33.23 |
| 2.000 | 37.12 |
| 2.244 | 41.03 |
| 2.518 | 44.97 |
| 2.825 | 48.92 |
| 3.170 | 52.90 |
| 3.557 | 56.93 |
| 3.991 | 61.03 |
| 4.477 | 65.20 |
| 5.024 | 69.41 |
| 5.637 | 73.63 |
| 6.325 | 77.77 |

| Size (μm) | Vol Under % |
|---|---|
| 7.096 | 81.73 |
| 7.962 | 85.41 |
| 8.934 | 88.68 |
| 10.024 | 91.48 |
| 11.247 | 93.74 |
| 12.619 | 95.47 |
| 14.159 | 96.71 |
| 15.887 | 97.52 |
| 17.825 | 98.01 |
| 20.000 | 98.27 |
| 22.440 | 98.41 |
| 25.179 | 98.51 |
| 28.251 | 98.63 |
| 31.698 | 98.78 |
| 35.566 | 98.98 |
| 39.905 | 99.20 |
| 44.774 | 99.42 |

| Size (μm) | Vol Under % |
|---|---|
| 50.238 | 99.63 |
| 56.368 | 99.81 |
| 63.246 | 99.92 |
| 70.963 | 100.00 |
| 79.621 | 100.00 |
| 89.337 | 100.00 |
| 100.237 | 100.00 |
| 112.468 | 100.00 |
| 126.191 | 100.00 |
| 141.589 | 100.00 |
| 158.866 | 100.00 |
| 178.250 | 100.00 |
| 200.000 | 100.00 |
| 224.404 | 100.00 |
| 251.785 | 100.00 |
| 282.508 | 100.00 |
| 316.979 | 100.00 |

| Size (μm) | Vol Under % |
|---|---|
| 355.656 | 100.00 |
| 399.052 | 100.00 |
| 447.744 | 100.00 |
| 502.377 | 100.00 |
| 563.677 | 100.00 |
| 632.456 | 100.00 |
| 709.627 | 100.00 |
| 796.214 | 100.00 |
| 893.367 | 100.00 |
| 1002.374 | 100.00 |
| 1124.683 | 100.00 |
| 1261.915 | 100.00 |
| 1415.892 | 100.00 |
| 1588.656 | 100.00 |
| 1782.502 | 100.00 |
| 2000.000 | 100.00 |

FIGURE 4 (CONT.)

| COMPOSITION OF COATED FERTILIZER GRANULES | TYPE | | WEIGHT/VOLUME | |
|---|---|---|---|---|
| Fertilizer | | | NPK | High Urea Blend (>75% Urea) |
| | | | 1000kg | 1000kg |
| Bonding Agent | Concentrated Lignosulphonate | | 10L | 2.5L |
| Micronized Composition | CaO | | 1200g | 3000g |
| | Sodium Activated Bentonite | | 3800g | 2000g |
| | Micro-nutrients | Zinc Sulphate | 9600g | 9600g |
| | | Cu-EDTA 14% | 600g | 600g |
| | | Manganese sulphate | 900g | 900g |
| | | Fe-EDTA 13% | 3000g | 3000g |
| | | Disodium octaborate terahydrate | 900g | 900g |

FIGURE 5

| SAMPLE | MOISTURE CONTENT (%) |
|---|---|
| Urea | 0,37 |
| 0h after coating the fertilizer | 0,84 |
| 24hrs after coating the fertilizer | 0,61 |
| 4 days after coating the fertilizer | 0,62 |

FIGURE 6

MICRONIZED COMPOSITION

This application is a 35 U.S.C. § 371 national phase application of PCT/IB2014/063769, filed Aug. 7, 2014, which claims priority to 2014/02264 filed on Mar. 27, 2014. Both applications are incorporated herein by reference as if fully set forth.

THIS INVENTION relates to a micronized composition. In particular the invention relates to a micronized composition, a coated fertilizer, a coated seed, a method of producing a micronized composition and a method of covering a granule.

BACKGROUND OF THE INVENTION

It is well known that micronutrients, such as Zinc (Zn), Iron (Fe), Manganese (Mn), Copper (Cu), Boron (B) and Molybdenum (Mo), are essential for the growth of plants. It has however always been a problem to correct micronutrient deficiencies in soil, with a hassle free, cost effective, single application product or process.

Water-soluble micronutrients, for example sulphate and chelate forms of micronutrients, are the optimal agronomical solutions to correct micronutrient deficiencies. Coating these micronutrients onto fertilizer granules would provide the most efficient method of applying micronutrients to the root zone of germinating seeds or sprouting plant material.

The inventor is aware of other micronutrient coated fertilizers, however most of these fertilizers are coated with water insoluble sources of micronutrients. Further, most bonding agents contain water which dissolves the materials that are being adhered to. Also, various chemical reactions occurs, which may cause caking, dissolution of the fertilizer granules and degradation of the overall product. The adhesion success of current products are usually temporary and the micronutrients may detach within a short time. Another problem with available products are that they use bonding agents which contain bunker oils or other industrial waste products. These bonding agents are therefore not environmentally friendly and their use may destroy microbial life in the soil, which also plays an important part in the growth of plants.

The current invention aims to address the abovementioned problems, and provide an efficient, economically viable and environmentally friendly coated fertilizer.

In this specification "micronized" refers to a material which has undergone the process of reducing the average diameter of the solid material's particles.

SUMMARY OF THE INVENTION

According to a first aspect of the invention there is provided a micronized composition for coating granules, which includes
  at least one type of water-soluble micronutrient;
  a clay binder; and
  a dehydrating agent, the at least one water-soluble micronutrient, clay binder and dehydrating agent being micronized.

"Micronized" refers to the composition which has undergone the process of reducing the average diameter of the solid material's particles in the composition.

The micronized composition may be micronized to an average particle size smaller than 50 μm in diameter.

In one embodiment at least 90% of the particles in the micronized composition may be smaller than 50 μm in diameter.

In another embodiment the micronized composition may be micronized to an average particle size smaller than 20 μm in diameter.

Preferably, the composition may be micronized to reduce the size of the particles to an average size smaller than 10 μm in diameter and 90% of the particles smaller than 50 μm in diameter.

The composition may be micronized with a high sheer high impact mill. The high sheer high impact mill may be in the form of a vortex crusher. In another embodiment the high sheer high impact mill crusher may be in the form of a ball mill crusher.

The clay binder may be in the form of any one or more of bentonite, attapulgite, and kaolin.

The clay binder may be in the form of sodium activated bentonite.

The sodium activated bentonite may have a typical chemical composition of about 55% $SiO_2$, 17% $Al_2O_3$, 6% $Fe_2O_3$, 2% CaO, 3% MgO, 1% $K_2O$, 3% $Na_2O$, 13% LOI. Specifically the sodium activated bentonite may have a typical chemical composition of 54.85% $SiO_2$, 17.00% $Al_2O_3$, 5.84% $Fe_2O_3$, 1.86% CaO, 3.47% MgO, 1.05% $K_2O$, 2.74% $Na_2O$ and 12.58% LOI. The sodium activated bentonite may have a typical mineral content of about 81% Montmorillonite, 12% Quartz, 1% Calcite, 1% Plagioclase, 3% Mica and 2% Zeolite.

In another embodiment the clay binder may consist of about 40% bentonite shale composition and 60% pure bentonite. The bentonite shale composition may consist of about 50% pure bentonite and 50% shale. The clay binder may have a pH of between 9 and 12.

The dehydrating agent may be operable to induce a state of dryness in the clay binder. The dehydrating agent may use any one of chemisorption and adsorption as a way of eliminating water. The dehydrating agent may react with water to change the dehydrating agent from an oxide to a hydroxide thereby to eliminate water in the clay binder.

The dehydrating agent may be in the form of any one or more of Aluminium Oxide, Sodium meta-silicate, Sodium Sulphate, Calcium Oxide, Phosphorous Pentoxide, Potassium Sulphate and Potassium Hydroxide.

The dehydrating agent may be in the form of Calcium Oxide and Aluminium Oxide. The dehydrating agent may be in the form of Calcium Oxide (CaO).

The at least one type of water-soluble micronutrient may in the form of any one of the group of: an inorganic salt of Zinc, Iron, Manganese, Copper, Boron and Molybdenum. The inorganic salt may be in the form of any one of Zinc sulphate, Iron sulphate, Manganese sulphate, Copper sulphate, salts of Boric Acid and Sodium Molybdate.

The at least one type of water-soluble micronutrient may be in the form of Boric Acid.

The at least one type of water-soluble micronutrient may be in the form of any one of the group of: a chelate of Zinc, Iron, Manganese and Copper. The chelate may be in the form of any one of ZnEDTA, CuEDTA, MgEDTA, FeEDTA, FeDTPA and FeEDDHA.

The micronized composition may include a combination of water-soluble forms of any two or more of Zinc, Copper, Manganese, Boron, Molybdenum and Iron.

The combination and ratio of the water-soluble micronutrients included may be determined by the deficiencies of the soil to which the granules are to be applied.

The combination and ratio of the water-soluble micronutrients included may be determined by the nutritional requirements of a crop.

The micronized composition may further include one or more types of insoluble micronutrients.

The micronized composition may be in the form of a dry powder.

The micronized composition may include between 50% and 85% (w/w) water-soluble micronutrients, between 5% and 25% (w/w) clay binder, and 5% and 20% (w/w) dehydrating agent.

The micronized composition may include between 50% and 85% (w/w) water-soluble micronutrients, between 5% and 25% (w/w) clay binder in the form of sodium activated bentonite and between 5% and 20% (w/w) dehydrating agent in the form of CaO.

Preferably the micronized composition may include about 25% (w/w) clay binder and dehydrating agent, and about 75% (w/w) micronutrients.

The micronized composition may include about 75% (w/w) micronutrients including at least one type of water-soluble micronutrient, about 19% (w/w) clay binder in the form of sodium activated bentonite and about 6% (w/w) dehydrating agent in the form of CaO.

In another embodiment the micronized composition may include about 75% (w/w) micronutrients including at least one type of water-soluble micronutrient, about 10% (w/w) clay binder in the form of sodium activated bentonite and about 15% (w/w) dehydrating agent in the form of CaO.

The invention also provides for a coated fertilizer, which includes
  a fertilizer granule;
  a bonding agent, coating at least a portion of an exterior surface of the fertilizer granule; and
  a micronized composition as discribed, the micronized composition being associated with the bonding agent.

The fertilizer granule may be in the form of any one of a phoshourous, nitrogen and potassium based fertilizer, including organic fertilizers and the like.

The fertilizer granule may be in the form of any one or more of monoammonium phosphate, diammonium phosphate, ammonium phosphate sulphate, ammonium nitrate, limestone and urea, urea ammonium phosphate, nitrophosphates, potassium chloride, potassium sulphate, potash magnesia, potassium nitrate, muriate of potash and sulphate of potash.

The bonding agent may be biodegradable.

The bonding agent may be in the form of a lignosulphonate. The bonding agent may be in the form of a lignosulphonate solution. The lignosulphonate solution may be of a concentrated lignosulphonate solution.

The lignosulphonate may be a calcium activated lignosulphonate.

The coated fertilizer may be produced by spraying the bonding agent on a plurality of fertilizer granules, and thereafter adding the micronized composition.

The micronized composition may be adhered to the bonding agent.

The micronized composition may be dispersed in the bonding agent.

The bonding agent may polymerize around the fertilizer granule and does not impregnate the fertilizer granule.

The ratio of bonding agent to micronized composition may be approximately 0.25-1 bonding agent:1-4 micronized composition.

The ratio of bonding agent to micronized composition may be approximately 1 v/v:2 w/w.

According to a further aspect of the invention there is provided a coated seed, which includes
  a seed;
  a bonding agent, coating at least a portion of an exterior surface of the seed; and
  a micronized composition as described, the micronized composition being associated with the bonding agent.

The seed may be in the form of any of cereals, grains, oil and protein seeds, vegetable seeds, commercial crop seeds and the like.

The bonding agent may be biodegradable.

The bonding agent may be in the form of a lignosulphonate. The bonding agent may be in the form of a lignosulphonate solution. The lignosulphonate solution may be of a concentrated lignosulphonate solution.

The lignosulphonate may be a calcium activated lignosulphonate.

The coated seed may be produced by spraying the bonding agent on a plurality of seeds, and thereafter adding the micronized composition.

The micronized composition may be adhered to the bonding agent.

The micronized composition may be dispersed in the bonding agent.

The bonding agent may polymerize around the fertilizer granule and does not impregnate the fertilizer granule.

The ratio of bonding agent to micronized composition may be approximately 0.25-1 bonding agent:1-4 micronized composition.

The ratio of bonding agent to micronized composition may be approximately 1 v/v:2 w/w.

The invention also extends to a method of producing a micronized composition, the method includes the steps of
  providing at least one type of water-soluble micronutrient;
  providing a clay binder;
  providing a dehydrating agent; and
  micronizing the at least one type of water-soluble micronutrient, clay binder and dehydrating agent to produce a micronized composition.

Micronizing may be in the form of milling the at least one type of water-soluble micronutrient, clay binder and dehydrating agent to produce a micronized composition having an average particle size smaller than 50 μm in diameter. Preferably, micronizing may be in the form of milling the at least one type of water-soluble micronutrient, clay binder and dehydrating agent to produce a micronized composition having an average particle size smaller than 10 μm in diameter and 90% of the particles smaller than 50 μm.

Micronizing may be by a high shear high impact mill. The high shear high impact mill may be in the form of a vortex crusher. The high shear high impact mill may be in the form of a ball mill crusher.

The invention further provides for a method of coating a granule, which includes the steps of
  adding a plurality of granules to a blender;
  spraying a biodegradable bonding agent onto the fertilizer granules in the blender, to produce coated granules;
  providing at least one type of water-soluble micronutrient;
  providing a clay binder;
  providing a dehydrating agent;
  micronizing the at least one type of water-soluble micronutrient, clay binder and dehydrating agent to produce a micronized composition; and
  adding the micronized composition to the coated granules in the blender.

The invention will now be described, by way of example only with reference to the following drawing(s).

DRAWING(S)

In the drawing(s).

In the drawings, like reference numerals denote like parts of the invention unless otherwise indicated.

Embodiment of the Invention

Figure 1:
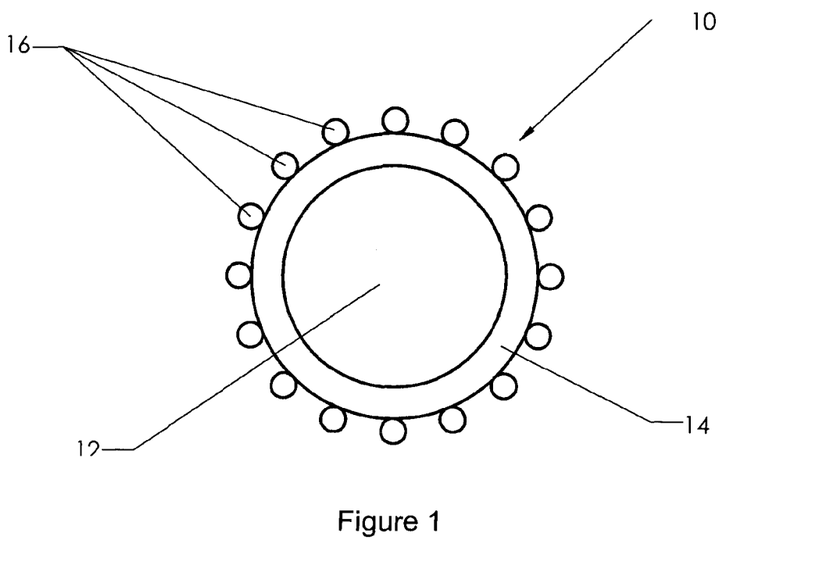
FIG. 1 shows a schematic representation of a coated fertilizer granule in accordance with one embodiment of the invention.

In FIG. 1 reference numeral 10, generally refers to a coated fertilizer in accordance with one embodiment of the invention. The coated fertilizer 10 includes a fertilizer granule 12, a biodegradable bonding agent 14, coating at least a portion of an exterior surface of the fertilizer granule 10 and a micronized composition 16, the micronized composition 16 being associated with the bonding agent 14.

The micronized composition 16 includes at least one type of water-soluble micronutrient, a clay binder and a dehydrating agent, the at least one water-soluble micronutrient, clay binder and dehydrating agent being micronized.

In this example the micronized composition is micronized to average particle sizes smaller than 10 μm in diameter.

The clay binder is in the form of sodium activated bentonite. The sodium activated bentonite has a typical chemical composition of 54.85% $SiO_2$, 17.00% $Al_2O_3$, 5.84% $Fe_2O_3$, 1.86% CaO, 3.47% MgO, 1.05% $K_2O$, 2.74% $Na_2O$ and 12.58% LOI. The sodium activated bentonite has a typical mineral content of about 81% Montmorillonite, 12% Quartz, 1% Calcite, 1% Plagioclase, 3% Mica and 2% Zeolite.

The dehydrating agent is operable to induce a state of dryness in its vicinity. In this example the dehydrating agent is in the form of Calcium Oxide (CaO).

In this example the at least one type of water-soluble micronutrient is in the form of a water-soluble form of Zinc, specifically it is in the form of Zinc Sulphate.

The micronized composition is in the form of a dry powder.

In a specific embodiment the micronized composition includes 75% (w/w) water-soluble micronutrients, 19% (w/w) sodium activated bentonite and 6% (w/w) CaO.

In this example the fertilizer granule is in the form of an urea fertilizer.

The bonding agent 14 is in the form of a lignosulphonate. Specifically in the form of a concentrated lignosulphonate solution made from natural wood.

In this example the micronized composition 16 is adhered to the biodegradable bonding agent 14.

As can be seen in FIG. 1, the bonding agent 14 polymerizes around the fertilizer granule 12 and does not impregnate the fertilizer granule 12.

The ratio of bonding agent 14 to micronized composition 16 is approximately 1 v/v:2 w/w.

The coated fertilizer 10 in this example is produced by adding a plurality of fertilizer granules to a blender and then spraying the biodegradable bonding agent 14, onto the fertilizer granules in the blender, to produce coated granules. The Zinc Sulphate, sodium activated bentonite and CaO is micronized to produce a micronized composition.

The Zinc Sulphate, sodium activated bentonite and CaO are micronized by introducing them into a pulverizer through a grate. They are then pulverized in a high shear high impact mill and then discharged via a crew auger to a bag house from where it is bagged.

The micronized composition is then added to the coated granules in the same blender, such as a ribbon batch blender or paddle blender. The coated fertilizer may be bagged immediately, or be allowed to air before being bagged.

In order to provide a stable coated fertilizer, the coated fertilizer must dry quickly, the micro-nutrients must completely adhere to the fertilizer granule and preferably the coated fertilizer must not be sticky, and not clump together.

Figure 2:
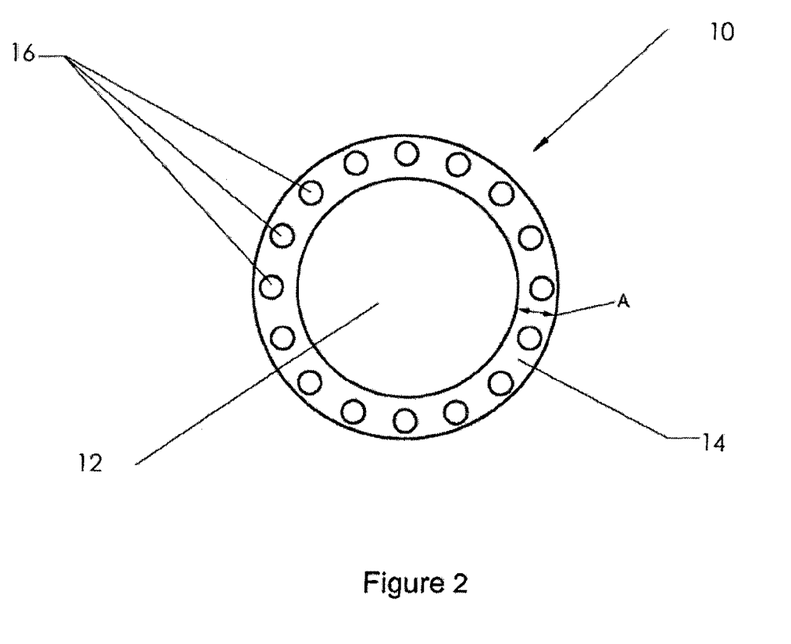
FIG. 2 shows a schematic representation of a coated fertilizer granule in accordance with another embodiment of the invention.

FIG. 2 shows a schematic representation of a coated fertilizer granule 10 in accordance with another embodiment of the invention. In this example it is shown that the bonding agent 14 forms a layer which is between 10 and 15 μm thick (marked A), around the fertilizer granule 12. The micronized composition 16 is of average particle sizes smaller than 10 μm, which is dispersed within the bonding agent 14 layer.

Figure 3:
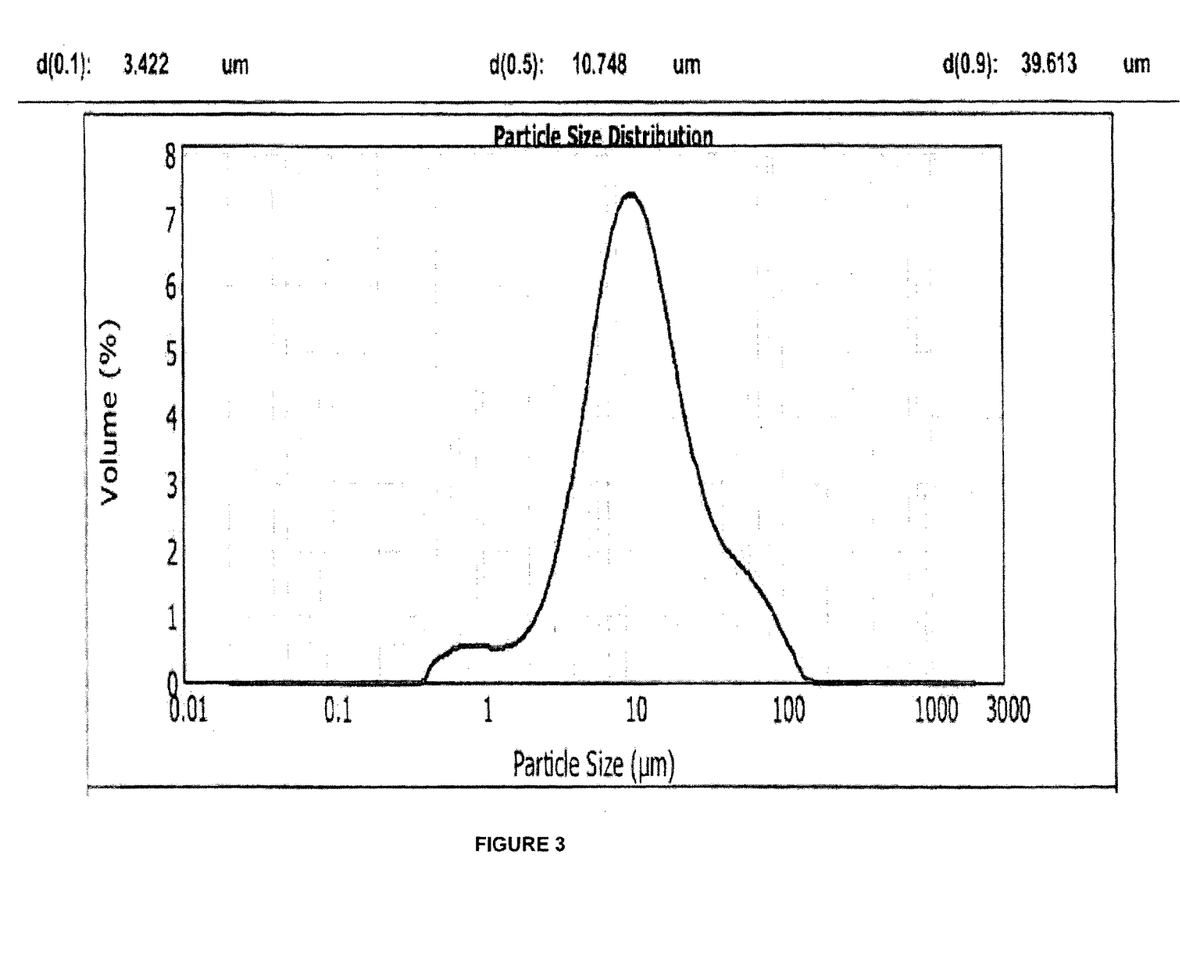
FIG. 3 shows a distribution graph of one example of the particle size of the micronized composition.
Figure 4:
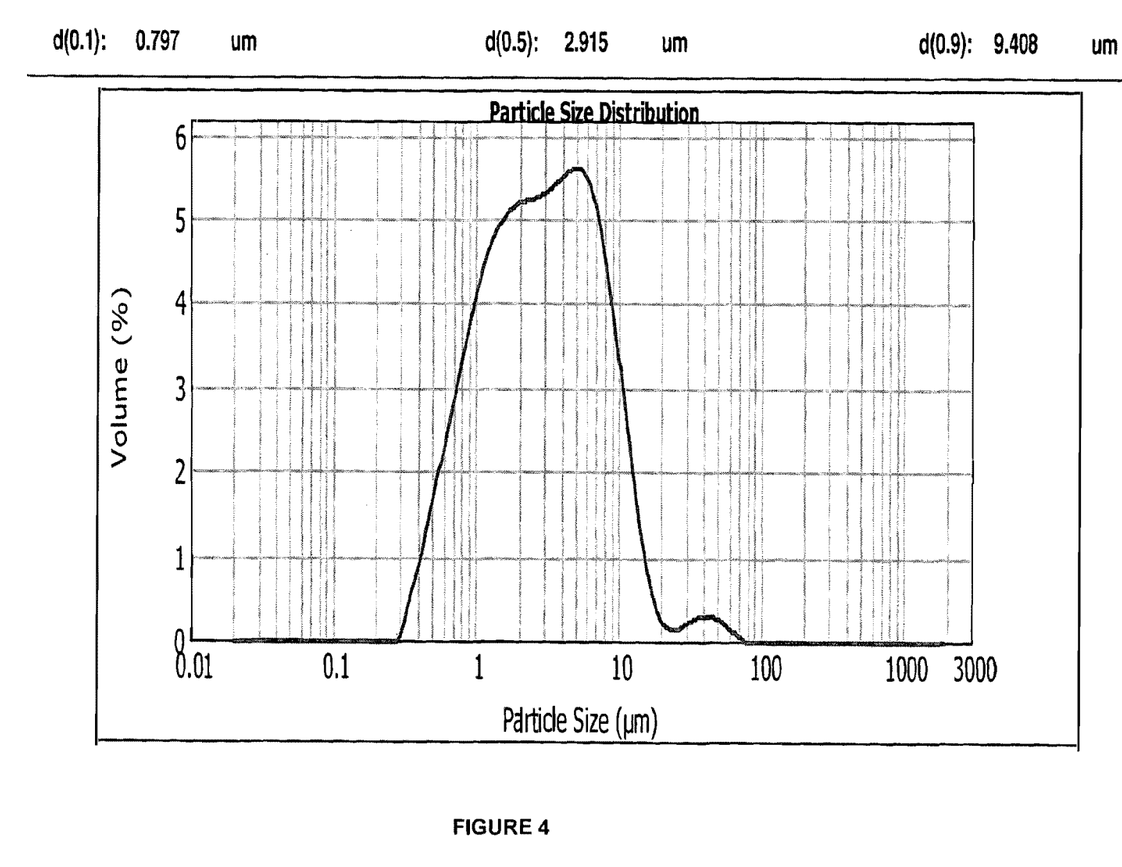
FIG. 4 shows a distribution graph of another example of the particle size of the micronized composition.

FIG. 3 shows a particle size distribution graph of one example of the micronized composition. In this example the average particle size is 10.748 μm and 90% of the particles are smaller than 40 μm. FIG. 4 shows a particle size distribution graph of another example of the micronized composition. In this example the average particle size is 2.915 μm and 90% of the particles are smaller than 10 μm.

Figure 5:
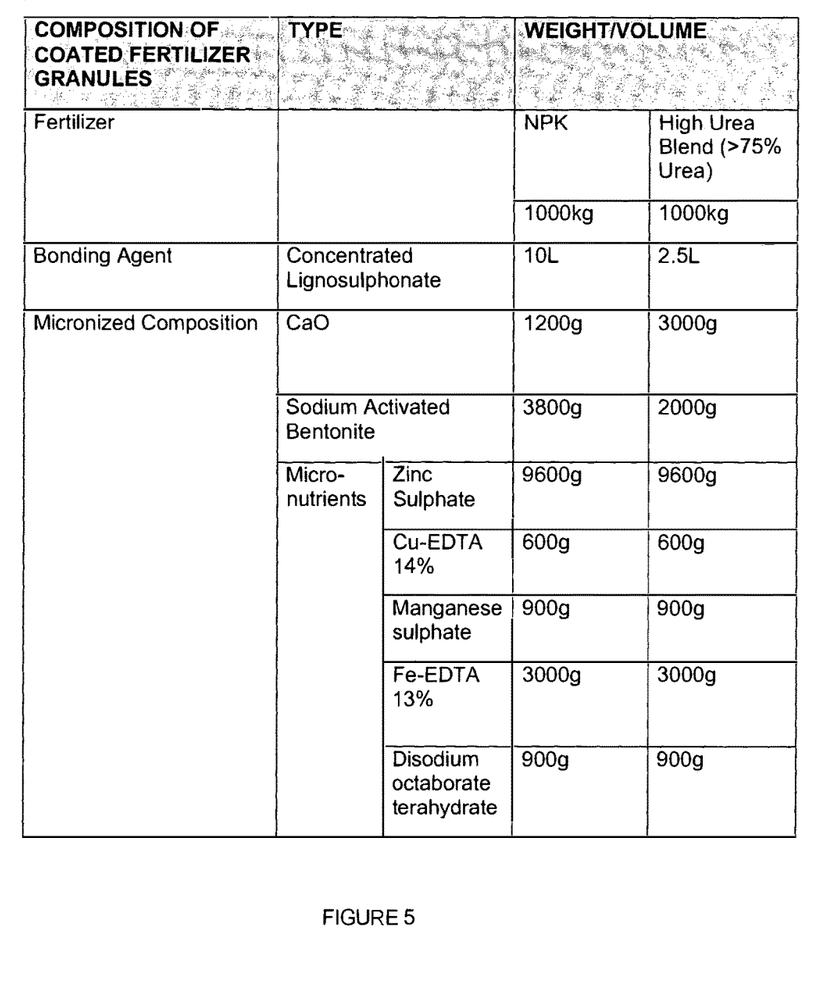
FIG. 5 shows the composition of two examples of coated fertilizers.
Figure 6:
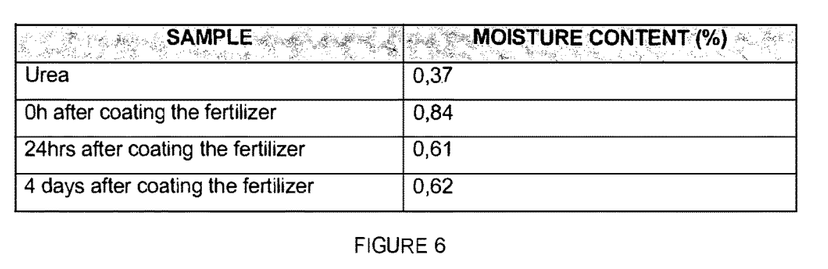
FIG. 6 shows the moisture content of the urea coated fertilizer of FIG. 5 over a period of time.

FIG. 5 shows a table indicating two examples of coated fertilizers in accordance with the invention. The urea coated fertilizer was tested for moisture content over a period of time. The results of this test is shown in FIG. 6. As shown in FIG. 6, the moisture content stabilizes at about 0.60% within 24 hours.

The inventor believes that the invention provides a new coated fertilizer, which is produced in one blender and in a single process. The coated fertilizer further does not require any anti-caking agent and is self curing thereby eliminating the need to dry the coated fertilizer, the coated fertilizer also remains dry for an extended period. Further the method of coating the fertilizer granules allows for complete adhesion of the micronutrients to the fertilizer granule. The invention also provides for new micronutrient coated seeds.

The invention claimed is:

1. A coated fertilizer, which includes
   a fertilizer granule;
   a bonding agent, coating at least a portion of an exterior surface of the fertilizer granule; and
   a micronized composition including at least one water-soluble micronutrient, a clay binder and dehydrating agent being micronized, the micronized composition being adhered to the bonding agent.

2. The coated fertilizer as claimed in claim 1, in which the fertilizer granule is selected from at least one of the group consisting of a phoshourous, nitrogen and potassium based fertilizer, or mixtures thereof.

3. The coated fertilizer as claimed in claim 1, in which the fertilizer granule is selected from at least one of the group consisting of monoammonium phosphate, diammonium phosphate, ammonium phosphate sulphate, ammonium nitrate, limestone and urea, urea ammonium phosphate, nitrophosphates, potassium chloride, potassium sulphate, potash magnesia, potassium nitrate, muriate of potash and sulphate of potash, or mixtures thereof.

4. The coated fertilizer as claimed in claim 1, in which the bonding agent is biodegradable.

5. The coated fertilizer as claimed in claim 4, in which the bonding agent is in the form of a lignosulphonate.

6. The coated fertilizer as claimed in claim 1, in which the micronized composition is micronized to an average particle size smaller than 50 μm in diameter.

7. The coated fertilizer as claimed in claim 1, in which the clay binder is selected from the group consisting of: bentonite, attapulgite, and kaolin, or mixtures thereof.

8. The coated fertilizer as claimed in claim 1, in which the clay binder is in the form of sodium activated bentonite.

9. The coated fertilizer as claimed in claim 1, in which the clay binder has a pH of between 9 and 12.

10. The coated fertilizer as claimed in claim 1, in which the dehydrating agent is selected from at least one of the group consisting of Aluminium Oxide, Sodium meta-silicate, Sodium Sulphate, Calcium Oxide, Phosphorous Pentoxide, Potassium Sulphate and Potassium Hydroxide, or mixtures thereof.

11. The coated fertilizer as claimed in claim 1, in which the dehydrating agent is selected from at least one of the group consisting of Calcium Oxide and Aluminium Oxide, or mixtures thereof.

12. The coated fertilizer as claimed in claim 1, in which the at least one type of water-soluble micronutrient is selected from at least one of the group consisting of an inorganic salt of Zinc, an inorganic salt of Iron, an inorganic salt of Manganese, an inorganic salt of Copper, an inorganic salt of Boron, an inorganic salt of Molybdenum, Boric Acid, a chelate of Zinc, a chelate of Iron, a chelate of Manganese and a chelate of Copper, or mixtures thereof.

13. The coated fertilizer as claimed in claim 1, in which the micronized composition includes a combination of water-soluble forms selected from at least two of the group consisting of: Zinc, Copper, Manganese, Boron, Molybdenum and Iron.

14. The coated fertilizer as claimed in claim 1, in which the micronized composition further includes one or more types of insoluble micronutrients.

* * * * *